H. J. DAVIS.
COTTON TRAMPER.
APPLICATION FILED APR. 1, 1912.
1,050,110.
Patented Jan. 14, 1913.
3 SHEETS—SHEET 1.
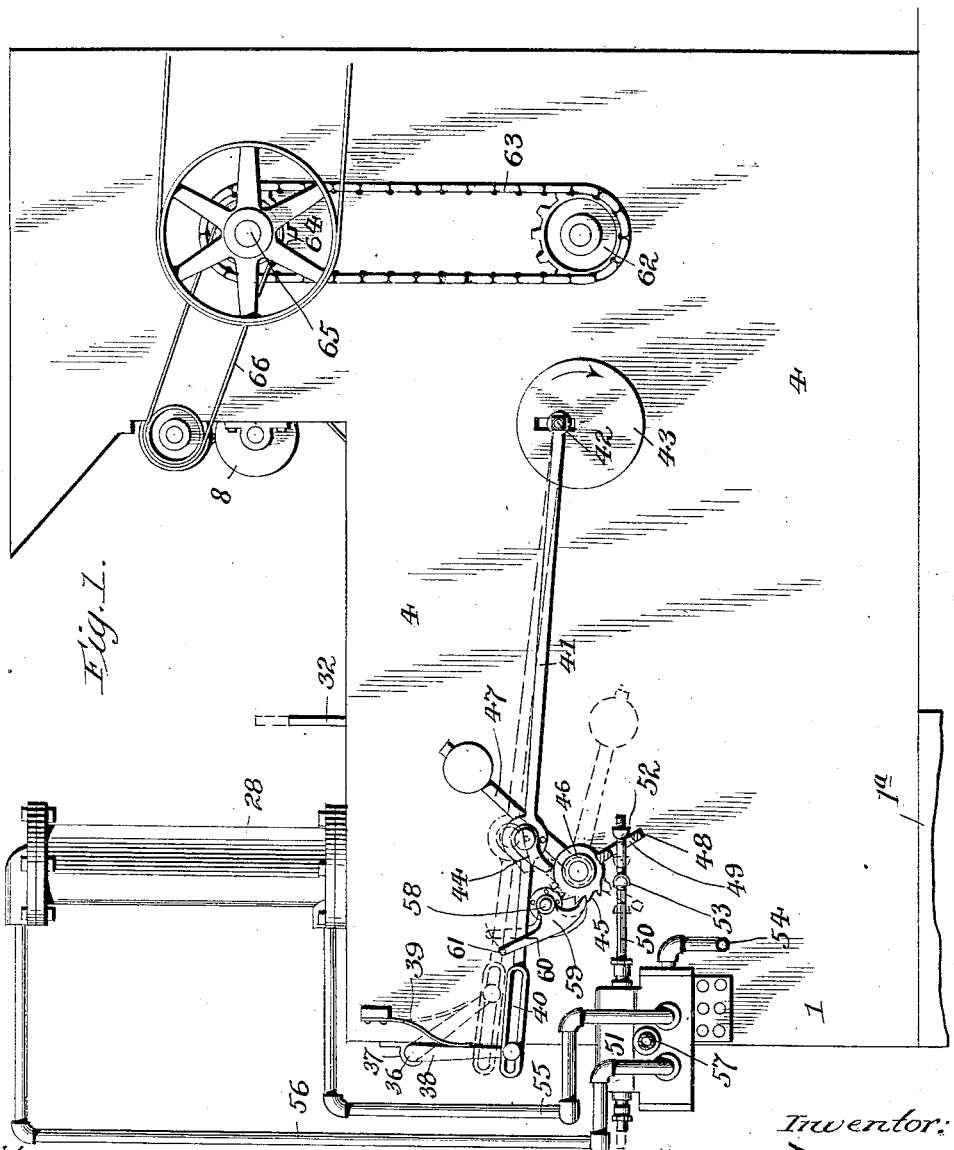

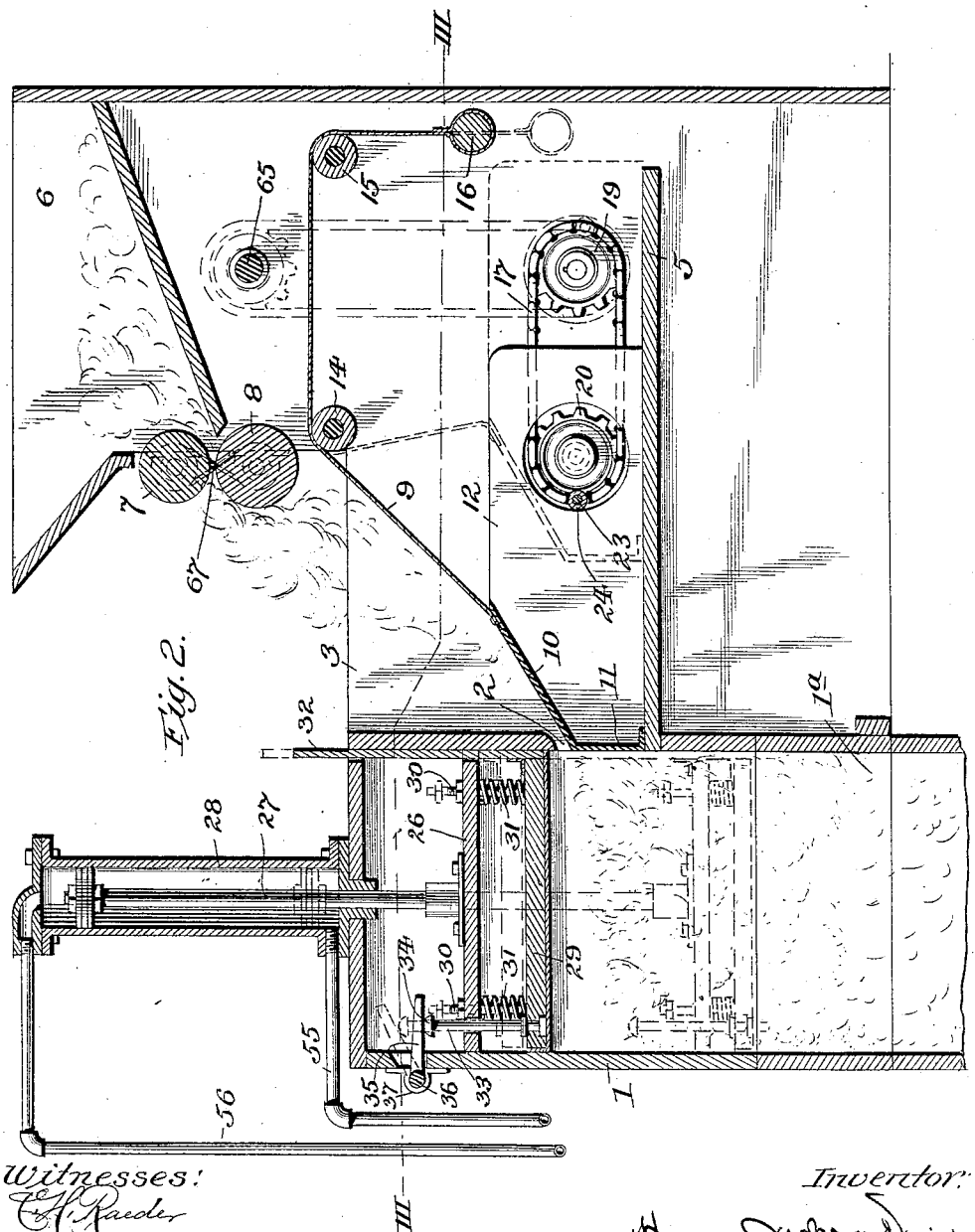

H. J. DAVIS.
COTTON TRAMPER.
APPLICATION FILED APR. 1, 1912.

1,050,110.

Patented Jan. 14, 1913.
3 SHEETS—SHEET 3.

UNITED STATES PATENT OFFICE.

HENRY JACKSON DAVIS, OF BIRMINGHAM, ALABAMA.

COTTON-TRAMPER.

1,050,110.  Specification of Letters Patent.  Patented Jan. 14, 1913.

Application filed April 1, 1912. Serial No. 687,728.

*To all whom it may concern:*

Be it known that I, HENRY JACKSON DAVIS, a citizen of the United States, residing at Birmingham, in the county of Jefferson and State of Alabama, have invented certain new and useful Improvements in Cotton-Trampers, of which the following is a specification.

My present invention pertains to improvements in trampers for cotton presses, the construction and advantages of which will be hereinafter set forth, reference being had to the annexed drawings, wherein:

Figure 1 is a side elevation of the mechanism as a whole; Fig. 2 a vertical longitudinal sectional view; and Fig. 3 a horizontal sectional view, taken on the line III—III of Fig. 2.

The main object of the present invention is to provide means for feeding cotton from the condenser to the tramper, said means comprising in the main a reciprocating plunger having an apron secured thereto, which apron extends upwardly from the plunger toward the condenser, combined with means for keeping the apron taut in all positions of the plunger.

A further object of the invention is to provide means whereby the cotton accumulating in the tramper will automatically actuate the valve mechanism which controls the tramper-head which is employed in the tramper box to compress the cotton.

Referring to Figs. 1 and 2 of the drawings, 1 denotes the tramper box, provided at one side with a lateral opening 2 and overlying the press-box 1ª. Extending from said side of the box is a trough-shaped member composed of side walls 3 and 4 and a bottom 5. The condenser 6 is located at the rear end of this trough-shaped member, and the cotton is fed therefrom between the rollers 7 and 8, or in any other approved manner, the cotton falling between the side walls 3 and 4 upon a flexible apron 9, said apron being secured at its forward end to the upper edge of an inclined plate 10, which plate is connected to or formed as an integral part of a vertically disposed plate or member 11. Said plates in effect form a plunger and are secured to two vertically-disposed timbers or plates 12 and 13 which rest upon the bottom 5. The apron 9 passes over idle rolls 14 and 15, the rear end of the apron being free and provided with a weighted bar 16, which tends to keep the apron taut under all working conditions.

A pair of sprocket chains 17, 18, Fig. 3, are mounted in the trough-shaped member near the bottom thereof, the chain 17 passing around a driven sprocket-wheel 19 and about an idler sprocket 20, while the chain 18 passes about a driven sprocket 21 and idler sprocket 22. A cross-bar 23, Fig. 2, extends from one sprocket-chain to the other and will preferably be provided with a roller sleeve 24, the sleeve bearing upon the walls of circular openings 25 and 25ª formed, respectively, in the members 12 and 13. From this it will be seen that when the sprockets 19 and 21 are actuated, motion will be imparted to the chains 17 and 18, and the members 12 and 13, which together with the plates 10 and 11, form the plunger, which feeds the cotton to the tramper box, will be moved back and forth in the trough-shaped member, so that any cotton which may be fed from the condenser rolls will be fed through the opening 2 into the tramper-box. Any means for actuating the plunger may be employed. The construction shown, however, is advantageous in that the weighted bar 16, acting through the apron, tends to pull the plunger head rearwardly and to take off of the cross-bar 23 and the roller 24 a certain amount, if not all, of the work which would have to be otherwise exerted to move the plunger backward. This enables the machine to speed up upon the rearward movement of the plunger. Moreover, the circular openings 25 and 25ª afford such a bearing for the roller 24 as to do away with the friction to a greater or less extent.

In Fig. 2 the plunger is shown in full lines in its forward position and in dotted lines in its rearmost position.

The apron fully protects the driving mechanism from the deposit of lint thereon, and should any lint work around the apron into the trough-shaped member it will in the main be cleared therefrom as the plunger moves from its rearmost to its forward position toward the tramper-box.

Mounted within the tramper-box is a tramper-head 26, connected to a piston-rod 27, working in a cylinder 28, which surmounts the tramper box. A supplemental head 29 is suspended from the head 26 by rods 30, which are freely movable through the head 26. Said heads are held apart through the action of springs 31, which are interposed between the heads and surround the rods 30, being held in position by said rods. The head 29 is provided with an upwardly-extending slide or curtain 32, which makes a close fit with the wall of the box in which the opening 2 is formed, said curtain serving, when the tramper head is forced downwardly, to close the opening 2 and prevent the ingress of cotton into the tramper-box above the head when said head is lowered. Extending upwardly from the lower head 29 and passing freely through the upper head 26, is a pin or rod 33, preferably provided with a rounded head 34, adapted to coact with an arm 35, secured to a rock-shaft 36, mounted in suitable bearings 37 secured to the outside of the tramper-box. The opposite end of said rock-shaft carries an arm 38, which is normally thrown downwardly away from the box by a spring 39, or its equivalent, a weight. Said arm 38 is provided at its lower end with a cranked portion which extends into a slot 40 in one end of a pitman or rod 41, the opposite end of said pitman being connected to a crank pin 42, adjustably secured to a crank disk 43. Said pitman carries a gravitating pawl 44, adapted to coact with a series of ratchet teeth 45, mounted upon a sleeved member 46, to the opposite end of which there is secured a weighted arm 47. The sleeved member 46 is likewise provided with an outwardly and downwardly extending member 48, provided with an elongated slot 49, through which freely passes a valve-stem 50, adapted to control a valve mounted in the chest 51. Said stem is provided with two adjustable stops or buttons 52 and 53, which coöperate with the member 48 to open and close the valve in the chest 51. Steam or other fluid under pressure is admitted to the valve through a pipe 54, and such pressure passes alternately to and from the upper and lower ends of the cylinder 28 through pipes 55 and 56. The exhaust passes from pipe 57, and, as will be understood, said pipe is thrown alternately into communication with the pipes 55 and 56, depending upon whether the steam or other fluid is being admitted to or above the piston into the cylinder. Pivotally mounted upon a stud or post 58, secured to the side of the tramper-box, is a gravitating pawl 59, the upwardly-extending arm 60 of which is provided with a laterally or inwardly-projecting finger 61, see Fig. 3, said finger overlying the rod or pitman 41 and adapted to be thrown out of locking engagement with the ratchet teeth 45 when said pitman is elevated. Said pawl 59 acts as a locking pawl for the valve-actuating member. The operation of this portion of the apparatus is as follows, it being understood that a continuous motion is imparted to the crank disk 43 from the sprocket 22, or the shaft which carries said sprocket, the latter being continuously driven through the chain 18, sprocket 21, sprocket 62, sprocket chain 63, the latter passing about a sprocket 64, mounted upon the power shaft 65. Said shaft, moreover, actuates the condensing rolls 7 and 8, through the belt 66, and cross-belt 67, Fig. 2. Through the rotation of the crank-disk an endwise movement is imparted to the pitman 41, which causes the gravitating pawl 44 to engage the teeth 45 of the ratchet member and to throw the same into the position shown in Fig. 1, the tramper head at such time being elevated. This motion, of course, is a gradual, step-by-step motion, and after the ratchet is advanced it will be held in such advanced position by the pawl 59. The pawl 44, after the ratchet is fully advanced, will ride over the rounded or plain portion of the ratchet carrier or member upon which the ratchet-teeth are formed, and the parts will occupy this position until the cotton is forced into the tramper-box sufficiently to raise the head 29 against the action of the springs 31, and through the rod 33 cause the rock-shaft 36 to be turned and through the arm 38 raise the rod or pitman 41 to the position shown in dotted lines in Fig. 1. Such upward movement will carry the pawl 44 out of line with the ratchet teeth 45, and, through the finger 61, throw the pawl 59 out of engagement with the teeth and permit the weight to carry the arm 47 downwardly into the position shown in dotted lines in Fig. 1, thereby causing the arm or member 48 to contact with the button 53 and force the valve-stem 50 inwardly, permitting the steam to pass into the upper end of the cylinder and exhaust from the lower end thereof. This will cause the descent of the tramper head and consequently the compression of the cotton into the press-box 1ª. The downward movement of the heads 26 and 29 will permit the spring 39 to move the arm 38 outwardly, or into the full-line position, and consequently permit the rod or pitman 41 to drop into the full-line position, whereupon the pawl 44 will again engage the ratchet teeth and tend to shift the valve-stem as the arm 48 is swung to the right, coming into contact with the button 52. This will reverse the position of the valve, and consequently permit the steam or other fluid under pressure to enter the lower end of the cylinder and to exhaust from the upper end thereof. While the tramper head is down, the slide or curtain 32, as before noted, will close the opening 2, and any cotton which may accumulate in the feed box will be slightly compressed in front of the reciprocating plunger, and be immediately carried into the tramper-box when the tramper head is elevated.

Having thus described my invention, what I claim is:

1. In a cotton-tramper, the combination of a tramper box provided with an opening in one wall thereof; a trough-shaped member in line with said opening; a reciprocating plunger working in said trough-shaped member; cotton-feeding means located above said trough-shaped member; an apron extending from the plunger rearwardly beneath said cotton-feeding means; and means for keeping the apron taut.

2. In a cotton-tramper, the combination of a tramper box provided with an opening in one side thereof; a trough-shaped member arranged in line with said opening; means located above said trough-shaped member for feeding cotton thereto; a plunger mounted in the trough-shaped member and adapted to be moved back and forth therein; an apron extending from the forward end of the plunger rearwardly in said trough-shaped member beneath the cotton-feeding means; and a weight carried at the rear end of the apron for keeping the same taut in all positions of the plunger.

3. In a cotton-tramper, the combination of a tramper box provided with an opening in one side thereof; a trough-shaped member located in line with said opening; means located above said trough-shaped member for feeding cotton thereto; a plunger located at the lower portion of the trough-shaped member and having a back-and-forth movement; an apron secured to the plunger and extending upwardly toward the cotton-feeding means; idle rolls over which said apron passes to the rear of said trough-shaped member; and a weight secured to the rear end of said apron and adapted to keep it taut in all positions of the plunger.

4. In a cotton-tramper, the combination of a tramper box provided with an opening in one wall thereof; a tramper head mounted in said box; means for raising and lowering said head; a curtain carried by said head and adapted, when the head is lowered, to close said opening; a trough-shaped member extending to one side of the box in line with said opening; a reciprocating plunger mounted in said trough-shaped member; an apron secured to said plunger and extending upwardly and rearwardly therefrom; means secured to the rear end of said apron to hold the same taut under all positions of the plunger; and cotton-feeding devices located above the apron.

5. In a cotton-tramper, the combination of a tramper box; a tramper head mounted and movable up and down therein; a trough-shaped member located in line with a feed opening formed in one side of the tramper box; a continuously-moving cotton-feeding device mounted in said trough-shaped member and adapted to force cotton inwardly to the tramper box through said opening; a power cylinder adapted to raise and lower the tramper head; a valve mechanism for controlling the supply of fluid to and from the upper and lower ends of said cylinder; means carried by the head for actuating the valve mechanism to admit fluid under pressure to the upper end of the cylinder; and means actuated from the feeding mechanism for throwing the valve mechanism into its opposite position.

6. In a cotton tramper, the combination of a tramper-box; a trough-shaped member located to one side thereof; a plunger mounted in said trough-shaped member and movable back and forth therein; a member secured to and extending rearwardly from said plunger and provided with a transverse circular opening therein; a pair of endless sprocket chains mounted in said trough-shaped member; a cross-bar connected to said chains and extending from one to the other through the opening aforesaid; means for driving said chains; an apron extending rearwardly from the plunger; and a weight connected to the rear free end of the apron.

7. In a cotton-tramper, the combination of a tramper-box; a trough-shaped member located to one side thereof; a plunger working in said trough-shaped member; a pair of plates extending rearwardly from said plunger, said plates each having a circular opening formed transversely thereof, said openings alining with each other; a pair of endless sprocket-chains mounted in said trough-shaped member outside of the plates; a cross-bar extending from one chain to the other and through the openings aforesaid; a roller carried by said bar and adapted to contact with the walls of the openings; means for driving said chains; an apron connected to the plunger and extending upwardly and rearwardly and at a point above the sprocket-chains; and a weight connected to the rear end of said apron and adapted to keep the same taut under all conditions and to assist in drawing the plunger rearwardly.

In testimony whereof I have signed my name to this specification in the presence of two subscribing witnesses.

HENRY JACKSON DAVIS.

Witnesses:
E. BREWER,
JAS. A. COLLINS.

---

Copies of this patent may be obtained for five cents each, by addressing the "Commissioner of Patents, Washington, D. C."